(12) United States Patent
Barkan

(10) Patent No.: US 6,929,184 B2
(45) Date of Patent: Aug. 16, 2005

(54) MONITORING BI-DIRECTIONAL MOTOR DRIVE FAILURE IN ELECTRO-OPTICAL READER

(75) Inventor: Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/701,874

(22) Filed: Nov. 5, 2003

(65) Prior Publication Data

US 2005/0092841 A1 May 5, 2005

(51) Int. Cl.[7] .................................................. G06K 7/14
(52) U.S. Cl. ............... 235/462.25; 235/454; 235/462.3; 235/474; 235/476; 235/435
(58) Field of Search .................................. 235/454, 476, 235/474, 435, 462.16, 462.25, 462.3, 461, 462.01

(56) References Cited

U.S. PATENT DOCUMENTS

| | | | | | |
|---|---|---|---|---|---|
| 3,739,154 | A | * | 6/1973 | Corcoran | 235/470 |
| 5,367,151 | A | * | 11/1994 | Dvorkis et al. | 235/462.36 |
| 2002/0162888 | A1 | * | 11/2002 | Wood | 235/462.14 |
| 2002/0170968 | A1 | * | 11/2002 | Blake et al. | 235/462.11 |
| 2003/0010826 | A1 | * | 1/2003 | Dvorkis et al. | 235/462.37 |
| 2003/0019937 | A1 | * | 1/2003 | Colley et al. | 235/462.36 |
| 2004/0050937 | A1 | * | 3/2004 | Barkan | 235/462.36 |

* cited by examiner

Primary Examiner—Karl D. Frech
Assistant Examiner—Daniel Walsh
(74) Attorney, Agent, or Firm—Kirschstein, et al.

(57) ABSTRACT

Malfunction of a bi-directional resonant motor drive in an electro-optical reader is detected without new hardware by monitoring the frequency of a start-of-scan signal, and by determining whether the monitored frequency lies within a predetermined frequency range.

10 Claims, 5 Drawing Sheets

MONITORING BI-DIRECTIONAL MOTOR DRIVE FAILURE IN ELECTRO-OPTICAL READER

BACKGROUND OF THE INVENTION

1. Field of the Invention

The invention generally relates to electro-optical readers and in particular to a bi-directional motor drive for affirmatively driving a scanning element in opposite directions and, more particularly, to monitoring drive failure.

2. Description of the Related Art

Various optical scanning systems and readers have been developed heretofore for reading indicia such as bar code symbols appearing on a label or on the surface of an article. The bar code symbol itself is a coded pattern of graphic indicia comprised of a series of bars of various widths spaced apart from one another to bound spaces of various widths, the bars and spaces having different light reflecting characteristics. The readers function by electro-optically transforming the spatial pattern represented by the graphic indicia into a time-varying electrical signal, which is in turn decoded into data which represent the information or characters encoded in the indicia that are related to the article or some characteristic thereof.

Such data is typically represented in digital form and utilized as an input to a data processing system for applications in point-of-sale processing, inventory control, distribution, transportation and logistics, and the like. Scanning systems and readers of this general type have been disclosed, for example, in U.S. Pat. Nos. 4,251,798; 4,369,361; 4,387,297; 4,409,470; 4,760,248; 4,896,026; 5,015,833; 5,262,627; 5,504,316; 5,625,483; and 6,123,265, all of which have been assigned to the same assignee as the instant application and each of which is hereby incorporated by reference herein. As disclosed in some of the above patents, one embodiment of such a scanning system resides, inter alia, in a hand-held, portable laser scanning device supported by a user, which is configured to allow the user to aim a scanning head of the device, and more particularly, a light beam, at a targeted symbol to be read.

The light source in a laser scanner bar code reader is typically a semiconductor laser. The use of semiconductor devices as the light source is especially desirable because of their small size, low cost and low voltage requirements. The laser beam is optically modified, typically by an optical assembly, to form a beam spot of a certain size at the target distance. It is often preferred that the cross-section of the beam spot measured in the scanning direction at the target distance be approximately the same as the minimum width in the scanning direction between regions of different light reflectivity, i.e., the bars and spaces of the symbol. Although typical readers utilize a single laser source, other bar code readers have been proposed with two or more light sources of different characteristics, e.g., different frequencies.

In the laser beam scanning systems known in the art, a single laser light beam is directed by a lens or other optical components along the light path toward a target that includes a bar code symbol on the surface. The moving-beam scanner operates by repetitively scanning the light beam in a line or series of lines across the symbol by means of motion of a scan element or scanning component, such as the light source itself or a mirror disposed in the path of the light beam. The scanning component may either sweep the beam spot across the symbol and trace a scan line across the pattern of the symbol, or scan the field of view of the scanner, or do both. The laser beam may be moved by an optical or opto-mechanical drive to produce a scanning light beam. Such action may be performed by either deflecting the beam (such as by a moving optical element, such as a mirror) or moving the light source itself. U.S. Pat. No. 5,486,944 describes a scanning module in which a mirror is mounted on a flex element for reciprocal oscillation by electromagnetic actuation. U.S. Pat. No. 5,144,120 describes laser, optical and sensor components mounted on a drive for repetitive reciprocating motion either about an axis or in a plane to effect scanning of the laser beam.

Another type of bar code scanner employs electronic means for causing the light beam to be deflected and thereby scan a bar code symbol, rather than using a mechanical motion to move or deflect the beam. For example, a linear array of closely spaced light sources activated one at a time in a regular sequence may be transmitted to the bar code symbol to simulate a scanned beam for a single source. Instead of a single linear array of light sources, a multiple-line array may also be employed, producing multiple scan lines. Such type of bar code reader is disclosed in U.S. Pat. No. 5,258,605.

Bar code reading systems also include a sensor or photodetector which detects light reflected or scattered from the symbol. The photodetector or sensor is positioned in the scanner in an optical path so that it has a field of view which ensures the capture of a portion of the light which is reflected or scattered off the symbol, detected, and converted into an electrical signal.

In retroreflective light collection, a single optical component, e.g., a reciprocally oscillatory mirror, such as described in U.S. Pat. No. 4,816,661 or U.S. Pat. No. 4,409,470, both herein incorporated by reference, scans the beam across a target surface and directs the collected light to a detector. The mirror surface usually is relatively large to receive as much incoming light as is possible, only a small detector being required since the mirror can focus the light onto a small detector surface, which increases signal-to-noise ratio.

Of course, small scan elements are preferable because of the reduced energy consumption and increased frequency response. When the scan element becomes sufficiently small, however, the area of the scanning mirror can no longer be used as the aperture for the received light. One solution is to use a staring detection system (a non-retroreflective system) which receives a light signal from the entire field which the scanned laser spot covers.

In non-retroreflective light collection, the reflected laser light is not collected by the same optical component used for scanning. Instead, the detector is independent of the scanning beam, and is typically constructed to have a large field of view so that the reflected laser light traces across the field of view of the detector. Because the scanning optical component, such as a rotating mirror, need only handle the outgoing light beam, it can be made much smaller. A relatively large detector, or a relatively small detector used with a magnifying lens, is employed in order to increase the amount of light collected.

Electronic circuitry and software decode the electrical signal into a digital representation of the data represented by the symbol that has been scanned. For example, the analog electrical signal generated by the photodetector may be converted by a digitizer into a pulse width modulated digitized signal, with the widths corresponding to the physical widths of the bars and spaces. Alternatively, the analog electrical signal may be processed directly by a software decoder. See, for example, U.S. Pat. No. 5,504,318.

The decoding process of bar code reading systems usually works in the following way. The analog signal from the sensor or photodetector may initially be filtered and processed by circuitry and/or software. The pulse width modulated digitized signal is applied to a software algorithm, which attempts to decode the signal. If the start and stop characters and the characters between them in the scan were decoded successfully and completely, the decoding process terminates and an indicator of a successful read (such as a green light and/or audible beep) is provided to the user. Otherwise, the decoder receives the next scan, and performs another decode according to symbology specification into a binary representation of the data encoded in the symbol, and to the alphanumeric characters so represented.

The binary data is communicated to a host computer by an interface cable or wireless communication link. The interface cable may be a "smart cable" such as that described in U.S. Pat. No. 5,664,229 and No. 5,675,139, the contents of which are hereby incorporated by reference herein.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used as is the actual size of the bars and spaces. The number of characters (represented by the bar code symbol) per unit length is referred to as the density of the symbol. To encode the desired sequence of the characters, a collection of element arrangements are concatenated together to form the complete bar code symbol, with each character of the message being represented by its own corresponding group of elements. In some symbologies, a unique "start" and "stop" character is used to indicate when the bar code begins and ends. A number of different bar code symbologies is in widespread use including UPC/EAN, Code 39, Code 128, Codeabar, and Interleaved 2 of 5.

In order to increase the amount of data that can be represented or stored on a given amount of surface area, several more compact bar code symbologies have been developed. One of these code standards, Code 49, exemplifies a "two-dimensional" symbol by reducing the vertical height of a one-dimensional symbol, and then stacking distinct rows of such one-dimensional symbols, so that information is encoded both vertically as well as horizontally. That is, in Code 49, there are several rows of bar and space patterns, instead of only one row as in a "one-dimensional" symbol. The structure of Code 49 is described in U.S. Pat. No. 4,794,239. Another two-dimensional symbology, known as "PDF417", is described in U.S. Pat. No. 5,304,786.

Still other symbologies have been developed in which the symbol is comprised not of stacked rows, but a matrix array made up of hexagonal, square, polygonal and/or other geometric shapes, lines, or dots. Such symbols are described in, for example, U.S. Pat. Nos. 5,276,315 and 4,794,239. Such matrix code symbologies may include Vericode, Datacode, and MAXICODE.

Moving-beam laser scanners are not the only type of optical instruments capable of reading bar code symbols. Another type of bar code reader is an imager, which incorporates detectors based on solid state imaging arrays or charge coupled device (CCD) technology. In such prior art readers, the size of the detector is typically smaller than the symbol to be read because of the image reduction by the objective lens in front of the array or CCD. The entire symbol is flooded with light from a light source, such as light emitting diodes (LED), and each cell or pixel in the array is sequentially read out to determine the presence of a bar or a space in the field of view of that cell.

The working range of CCD bar code scanners is rather limited as compared to laser-based scanners and is especially low for CCD based scanners with an LED illumination source. Other features of CCD based bar code scanners are set forth in U.S. Pat. No. 5,396,054 which is hereby incorporated by reference, and in U.S. Pat. No. 5,210,398. These references are illustrative of the certain technological techniques proposed for use in CCD type scanners to acquire and read indicia in which information is arranged in a two-dimensional pattern. CCD readers may be used in conjunction with moving-beam laser scanners for bar code reading, such as described in U.S. Pat. No. 5,672,858, the contents of which are hereby incorporated by reference herein.

For safety reasons, there are regulations concerning the maximum level of laser beam output power that can be emitted from an electro-optical reader, and this maximum level depends on whether or not the reader is operative to shut off the laser upon detection of a failure of the drive that oscillates the scan element. For example, a Class II laser safety device is limited to a maximum laser output power of 1 mw if there is no laser shut-off feature. If there is a laser shut-off feature, then the device is permitted to output a higher power in the emitted stationary laser beam. A higher laser beam output power is desirable for an increased working range, ambient light immunity, greater scan line visibility and, in general, better overall reader performance.

It is known in the art to use a hardware circuit to detect drive failure. The drive includes a motor and a feedback winding that generates a feedback signal having a voltage or amplitude. The hardware circuit monitors the amplitude of the feedback signal and turns the laser off if the amplitude falls below a predetermined threshold, thereby indicating that the drive is malfunctioning. Although generally satisfactory for their intended purpose, the known hardware circuits consume electrical power, occupy non-negligible space in a reader, and add extra weight to the reader. These features are not desirable for a handheld reader where space, weight and electrical power consumption are to be kept to a minimum.

SUMMARY OF THE INVENTION

Objects of the Invention

It is a general object of the present invention to provide an improved motor drive circuit for a small, lightweight bar code reader.

It is another object of the invention to provide a software-based circuit for monitoring failure of a bi-directional motor drive circuit.

It is an even further object of the invention to provide a method which can be used to accomplish one or more of the above objects.

Additional objects, advantages and novel features of the present invention will become apparent to those skilled in the art from this disclosure, including the following detailed description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

FEATURES OF THE INVENTION

In keeping with these objects, one feature of this invention resides, briefly stated, in a method of, and an arrangement for, detecting a malfunction of a bidirectional motor drive in a reader for electro-optically reading indicia. According to the invention, a resonant motor has a rotor oscillatable about an axis. A permanent magnet is jointly oscillatable with the rotor. A scanning element, preferably a light reflector, is jointly oscillatable with the rotor, and is operative for directing a light beam at the indicia to be electro-optically read.

In addition, a drive coil is positioned in operational proximity with the magnet, and is operative for generating a drive signal to drive the rotor, the magnet and the scanning element in opposite directions about the axis over the indicia at a resonant frequency. A feedback winding is positioned in operational proximity with the magnet, and is operative for generating a feedback signal having a feedback frequency corresponding to the resonant frequency during oscillation of the magnet.

In accordance with the invention, a zero crossing detector, preferably a comparator, for detecting zero crossings, of the feedback signal is used to generate a start of scan (SOS) signal having an SOS frequency; and a control processor is employed for monitoring the SOS frequency, and for sensing the malfunction when the SOS frequency is outside a predetermined range of SOS frequencies. The processor generates a laser shut-off signal when the malfunction is sensed. The predetermined range of SOS frequencies is ±20% of the resonant frequency.

Hence, a malfunction of the motor drive is detected without resorting to the hardware circuitry of the prior art. The SOS signal is already present and normally generated by the existing readers in order to advise the decoder when a new scan is starting. The control microprocessor is already present in the existing readers in order to control the performance of the reader. Thus, without new hardware, this invention proposes the monitoring of the SOS frequency in order to sense motor drive malfunction.

The novel features and characteristics of the invention are set forth in the appended claims. The invention itself, however, as well as other features and advantages thereof, will be best understood by reference to a detailed description of a specific embodiment, when read in conjunction with the accompanying drawings.

DESCRIPTION OF THE PREFERRED EMBODIMENTS

As used in this specification and in the appended claims, the term "indicia" broadly encompasses not only symbol patterns composed of alternating bars and spaces of various widths commonly referred to as bar code symbols, but also other one- or two-dimensional graphic patterns, as well as alphanumeric characters. In general, the term "indicia" may apply to a type of pattern or information which may be recognized or identified by scanning a light beam and detecting reflected or scattered light as representation of variations in light reflectivity at various points of the pattern or information. A bar code symbol is one example of an "indicia" which the present invention can scan.

Figure 1:
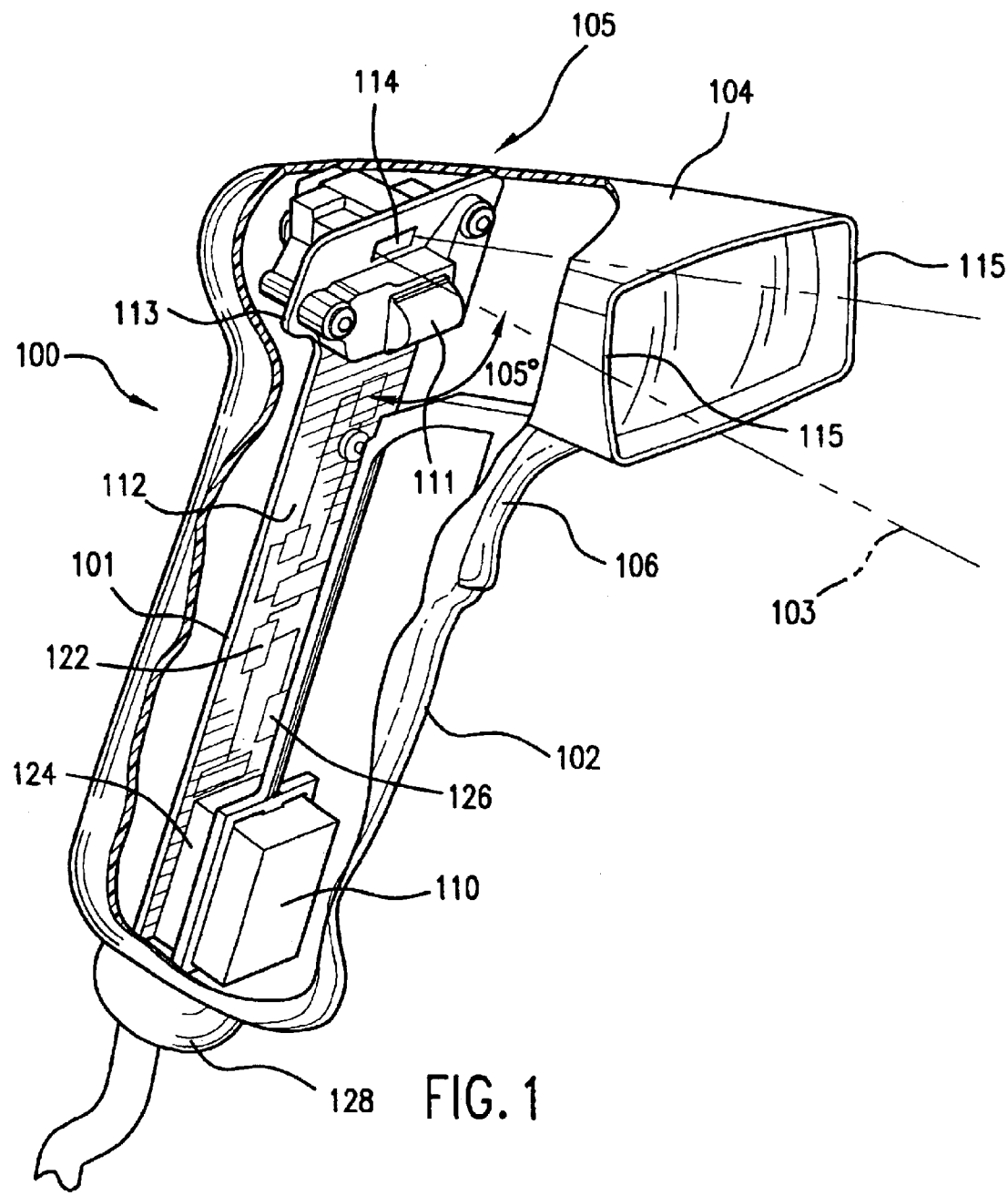
FIG. 1 is a cut-away perspective view of a triggered bar code reader.

As a preferred embodiment, we describe the implementation of the present invention in a laser-scanning, bar code reading unit similar to the hand-held reader illustrated in FIG. 1. The device of FIG. 1 is generally of the style disclosed in U.S. Pat. No. 6,186,400 assigned to Symbol Technologies, Inc. and hereby incorporated by reference, and also similar to the configuration of a bar code reader commercially available as part number LS 4000 or LS 1900 from Symbol Technologies, Inc. of Holtsville, N.Y. Alternatively, or in addition, features of U.S. Pat. Nos. 4,387,297 and 4,760,248 issued to Swartz et al., or U.S. Pat. No. 4,409,470 issued to Shepard et al., both such patents assigned to Symbol Technologies, Inc., may be employed in constructing the bar code reader of FIG. 1. These U.S. Pat. Nos. 4,760,248, No.4,387,297 and No. 4,409,470 are incorporated herein by reference.

FIG. 1 shows the overall layout and design of the reader 100. There is a single printed circuit board (PCB) 101 that slides into the housing handle 102 in a vertical fashion. The PCB is oriented at a 105 degree angle with the exiting scan plane 103. The housing is shown in as a cut-away view. The housing consists of a handle 102 and canopy 104 molded in a fashion similar to that known in the art. The PCB supports the scan engine 105, trigger switch 106, LEDs, beeper, modjack connector and related electronics. The scan engine is a non-retroreflective system with a photodetector assembly on the front side 112 of the PCB and a scanning assembly on the rear side 113 of the PCB. This allows the laser beam scanning field to be closely matched with the collection field. An outgoing laser beam passes through a slot 114 in the PCB and is clipped by the exit window edges 115 of the housing so it is usable almost to the end of the scan line.

Figure 2:
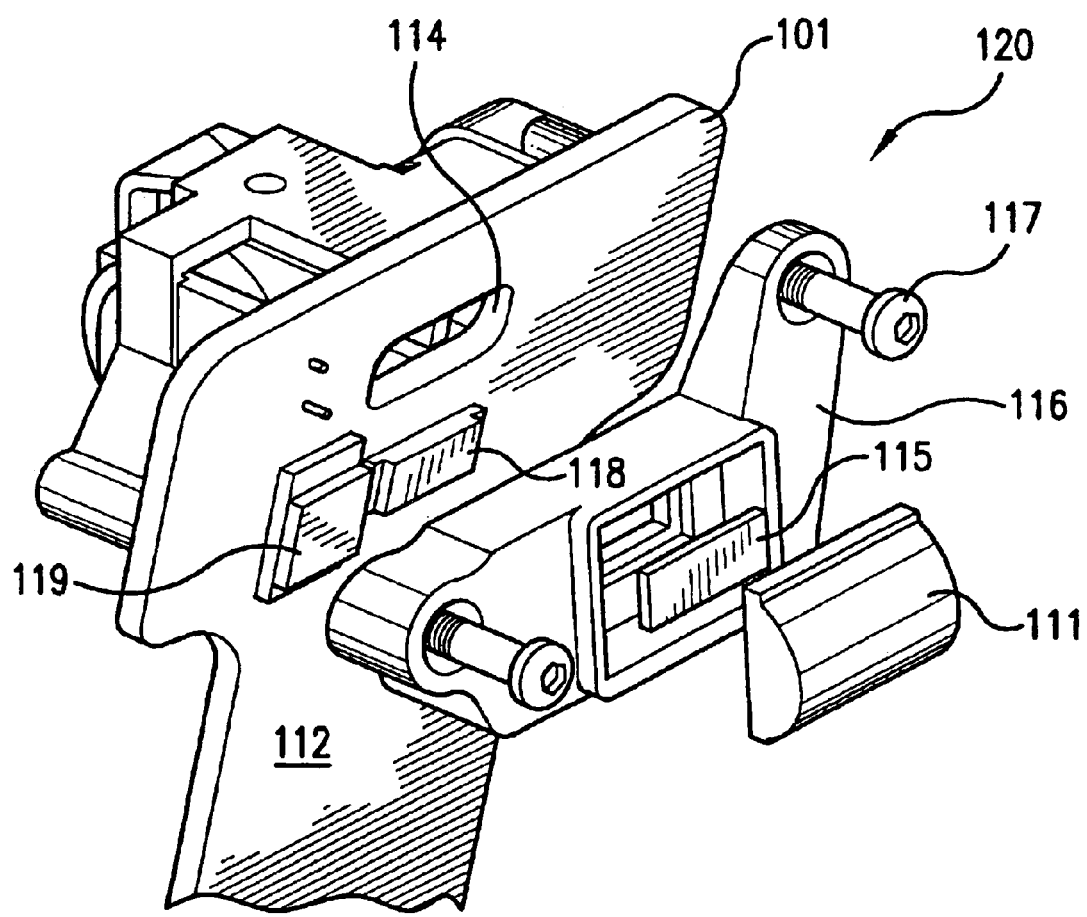
FIG. 2 is an enlarged, exploded view of the photodetector assembly of the reader of FIG. 1.

FIG. 2 shows an exploded view of the photodetector assembly 120. Shown from right to left are a cylindrical collection lens 111, optical filter 115, molded plastic chassis 116, and mounting screws 117. Shown on the PCB are the photodetector 118 and amplifier 119 which will be enclosed by the chassis 116. The chassis 116 will be coated with nickel (or some similar material) to provide electrical shielding of the photodetector and amplifier. There will be another part (not shown) that will provide electrical isolation between the screws 117 that connect the chassis 116 to the chassis of the scanning assembly (through the PCB).

Figure 3:
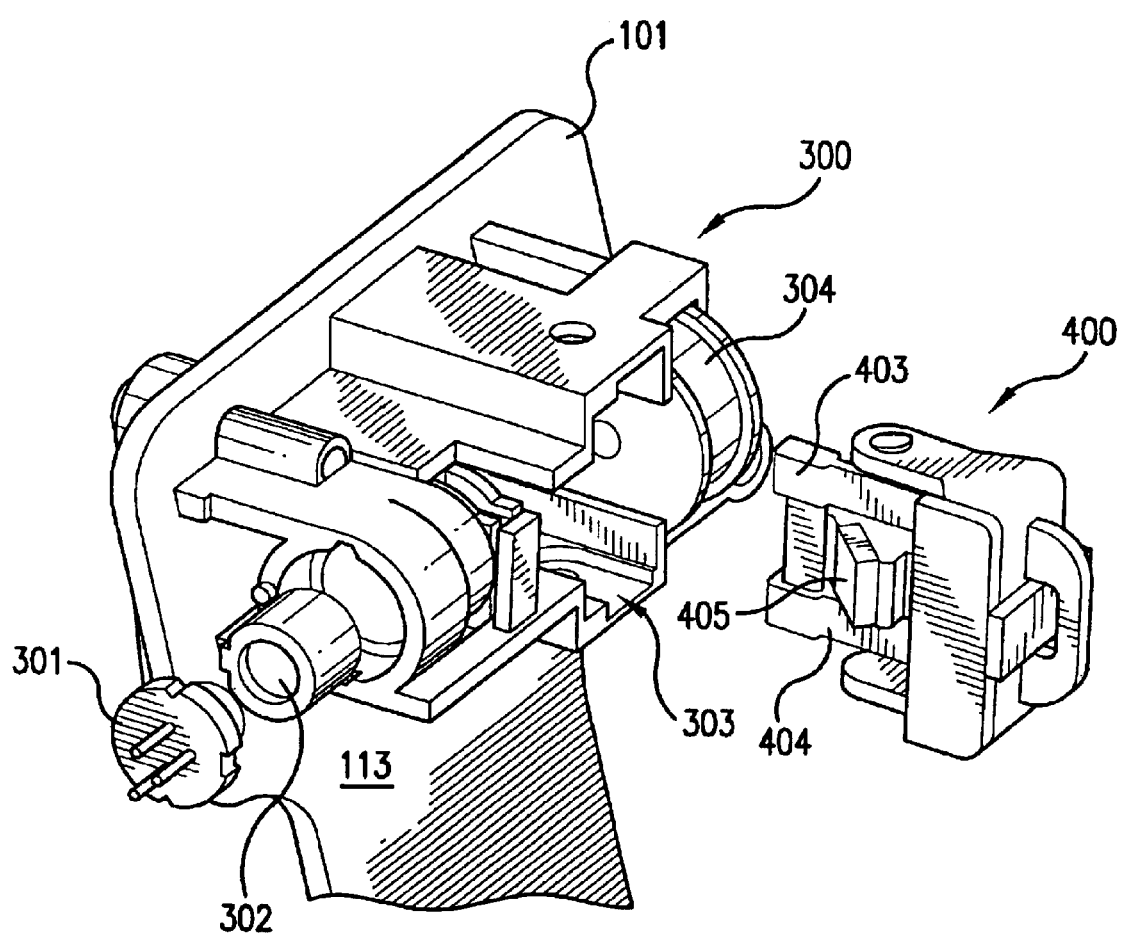
FIG. 3 is an enlarged, exploded view of the scanning assembly of the reader of FIG. 1.

FIG. 3 is a partially exploded view of the scanning assembly 300 which includes a laser/motor chassis as a die cast part allowing the laser 301 to be heat sunk. The laser 301 and lens 302 are shown exploded to the left. The lens 302 may be a molded design similar to a molded plastic anamorphic lens or a glass lens with a separate injection molded cylindrical corrector. To the right is the liquid silicone injection (LSI) molded motor assembly 400. This assembly 400 slides into a slot 303 in the chassis of the scanning assembly 300 and snaps in place. Plus or minus five degrees mechanical adjustment is allowable during alignment to get the laser beam in the right location horizontally. The assembly 400 is then bonded in place. The chassis provides containment for shock protection but an additional part has been added to limit movement during a shock event. The electromagnetic drive coil 304 is trapped in place by the chassis when it is secured to the PCB with the screws 117 from the collection chassis.

Figure 4C:
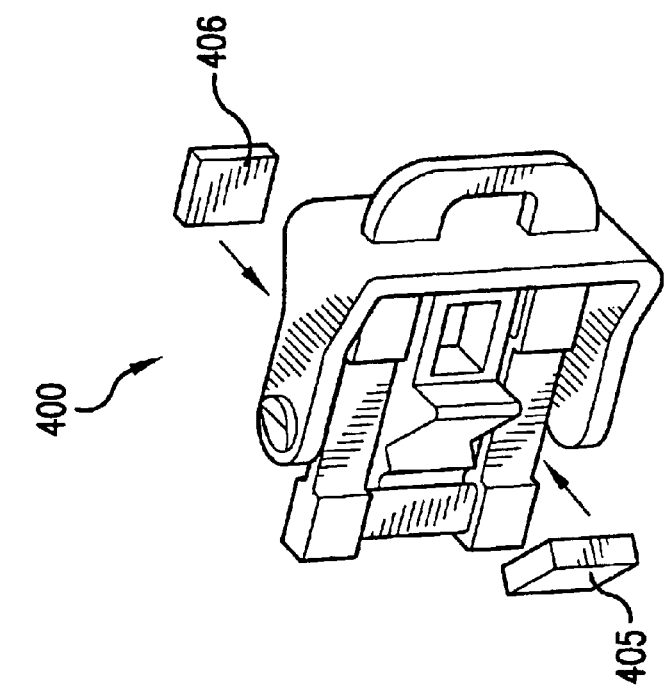
FIGS. 4A, 4B, 4C are perspective views of the scanning assembly of FIG. 3 in successive stages of fabrication.
Figure 4B:
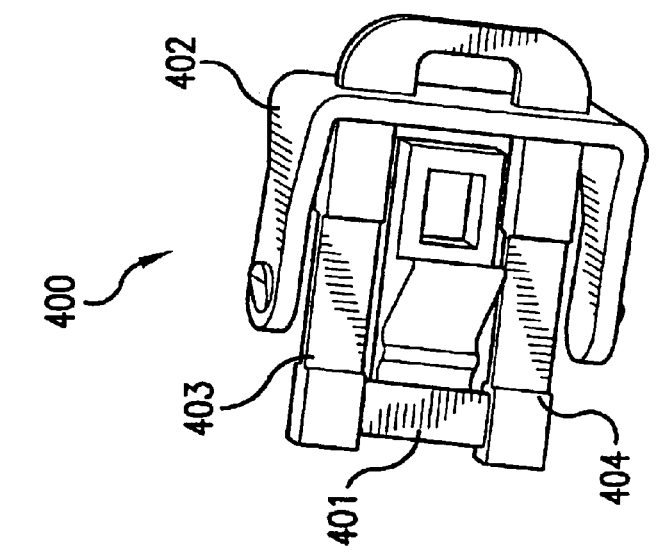
Figure 4A:
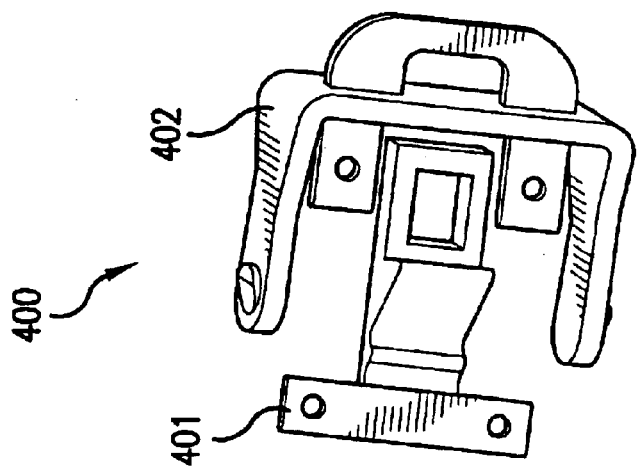

FIGS. 4A, 4B and 4C are views of the motor assembly 400 in different stages of fabrication. From left to right are:

(a) Injection molded dynamic and static motor parts. The dynamic part 401 will hold the mirror 405 and magnet 406. The static part 402 will attach to the chassis.

(b) Injection molded parts from FIG. 4A with two liquid silicone injection overmolded springs joining the dynamic and static parts.

(c) The mirror and magnet are shown in an exploded view, prior to being bonded to the dynamic part 401. An additional shock protector may be added as mentioned above. The assembly 400 is now ready to mate and snap into the chassis 300 of the scanning assembly.

The preferred embodiments of the invention use a mirror as the scanning component which moves to produce the desired scanning motion of the beam spot over the indicia; however, other optical components could be moved. For example, the flexible support structure could support a light emitter (e.g., a laser diode) or an objective focusing lens for reciprocal motion, or both, to produce the scanning motion of the beam spot, as described in U.S. Pat. No. 5,144,120.

As noted above, FIGS. 4A, 4B, 4C are perspective views of the reader scanning assembly 400 in successive stages of fabrication having two injection molded springs.

The use of elastomeric hinges in a motor design is known from the U.S. Pat. No. 6,173,895 to Plesko.

The present invention further provides a technology to make a motor with a rubber hinge by inserting the metal parts into the mold in an injection molding machine, and by injecting the rubber into the mold. This is similar to the process used to create the rubber overmold used on housings of bar code readers. Insert molding is also used to create the motor drive coil bobbins with PCB pins used in many bar code readers. In other words, insert molding is a well established technology that has frequently been used for inexpensive, high volume products. Creating the hinge by insert molding should provide better consistency than the proposed method because it avoids having to trim the rubber off at the top and bottom of the hinge, as is required with the Plesko method. If it is injection molded, the hinge can be molded to the desired length, thickness, shape, etc.

The motor assembly is performed in three steps (as shown in FIGS. 4A, 4B and 4C):

1. Provide a family mold of plastic subcomponents 401 and 402 using a very simple mold design.

2. Overmold the silicone flexures 403 and 404 onto family plastic subcomponents 401 and 402.

3. Assemble the mirror 405 and magnet 406 by bonding to the parts to the assembly of step 2.

Injection molding the hinge also allows some other things that are not possible with the prior art Plesko design. For example, the hinge can be molded with a hole or thin spot in the middle, which would reduce the resonant frequency without losing stiffness in the axes that would cause a loop to form in the scan line. Shaping the rubber would allow independent control of stiffness of the hinge in different axes.

Another way to make a motor would be to replace the metal parts with plastic parts. This would allow more complex features to be created than is possible with the thin metal parts used by the prior art of Plesko. For example, features to mount the stationary end of the hinge to a circuit board, or to the drive coil, or to any other part of the structure of the scan engine would be molded in the hard plastic parts. Features to position the magnet or mirror on the moving part can also be molded in. The rubber hinge can then be between the two plastic parts. A good example of this kind of process can be seen on many toothbrushes presently available that have flexible rubber sections molded into them.

Another possibility is to use metal parts, like the Plesko design, and then to mold rigid plastic mounting features onto the metal, and to also mold a rubber hinge between two pieces of metal.

The use of injection molded parts, instead of the metal parts Plesko uses can have some additional benefits. Plesko is using metal parts that are photo-etched out of a sheet of flat material. This means that the entire flexure assembly must be designed as a flat assembly. In other words, the moving end of the flexure that supports the mirror and magnet, the rubber hinge and the stationary end of the flexure are all in a single plane. This is the cause of some features of the Plesko design that are not ideal. For example, Plesko's motor as the center of mass of the moving parts of the assembly is offset from the center of rotation. This is unavoidable in such a planar design. The result of this is that the motor is not balanced. This means that the position of the scan line shifts when the scan line shifts when the scanner is held on its side. The moving parts of the motor droops toward the floor, making the line move downward.

This might be acceptable in some non-retroreflective scanner designs, especially if they are laser Class II. A Class II product can have lots of laser power which allows it to have adequate ambient light immunity even if the collection system has a large field of view. However, for relatively inexpensive scanners to be used for consumer applications, one tries to minimize laser power, e.g., 0.2 mw laser power which is suitable for IEC Class I. Industrial scanner engines operate at 0.8 mw, making them Class II. This means one needs to design the collection optics in a non-retro scan to have a field of view as small as possible. Otherwise ambient light rejection will be inadequate. In order for the field of view to be small, one must know precisely where the scan line is going to be positioned with respect to the engine. If there is uncertainty about scan line position, the field of view must be enlarged to include the entire area over which the scan light might be found. An unbalanced motor design, like Plesko, requires the collection field of view to be increased (reducing ambient light immunity), so that the scan line does not move out of the field of view, no matter what position the scanner is in.

If the molded plastic replaces the metal parts in a motor with a rubber hinge, it becomes possible to mold in features to balance the motor by distributing the weight of the moving parts equally on either side of the center of rotation.

Another advantage of plastic parts in a motor like this is that it can allow the whole motor to package better into a smaller engine. This can be seen by examining an axial engine design. In these engines the scan mirror is positioned so that it is rotated 45 degrees with respect to the face of the drive coil. The mirror on Plesko's new planar motor design can't do this. The mirror is parallel to the face of the drive coil.

The laser has to strike the mirror at approximately 45 degrees. This means that the entire new planar motor must be rotated 45 degrees with respect to the incoming laser beam. The MCM motor, on the other hand, can have the laser beam shining parallel to the face of the coil. It will then hit the mirror at 45 degrees and be deflected 90 degrees so that it projects perpendicular to the face of the motor drive coil. This ability proves to be much better when packing a scanner into a minimum space. It doesn't package nearly as well as a motor with the mirror mounted at 45 degrees to the coil face.

If the mirror mount is injection molded plastic, instead of etched sheet metal, the mount can be designed to hold the mirror at 45 degrees, allowing the motor to be fit into a smaller scan engine.

The motor according to the present invention may be designed using a silicone LIM spring and operate at approximately 30 Hz (resonant frequency). The stationary motor bracket and dynamic (mirror and magnet) holder may also be injection molded. These two parts may be molded in one family mold, if desired. In one embodiment, the dynamic and static molded parts may be transferred to a liquid silicone injection molding machine to have the spring overmolded to make an integral assembly. The mirror and magnet are then bonded to the dynamic holder. The motor assembly is then fit over a post in the chassis and adjusted for pointing if necessary.

LIM silicones are one group of materials that can be used for the spring in this motor. It is possible that a thermoplastic with a low enough elastic modulus could be used as well. In this case the molded parts may not have to be transferred from a conventional molding machine to a LIM machine to have the spring molded in place. This could be a two shot process done on one machine with potentially lower fixed cost.

The laser diode may be operated in a continuous "constant power" mode, pulsed, or modulated with different power levels, depending on the specific application. It is also known to provide circuitry to maintain the laser diode at a predetermined output power level using a closed-loop feedback circuit using a monitor photodiode associated with the diode.

The optical subassembly associated with the laser diode may include a focusing lens and/or aperture stop of the following lens types, depending on the application: spherically symmetric glass or plastic lenses; aspheric glass or plastic lenses, rotationally symmetric as well as non-rotationally symmetric around the optical axis, such as cylindrical optical elements as well including gradient index lenses, Fresnel lenses, binary optical lenses, or multi-level binary optical lenses; lens systems where the lens diameter itself acts as a functional aperture stop for the system; or holographic optical elements, including but not restricted to Fresnel "zone plate" optics.

The laser beam is directed to the planar mirror 405, which is moved so as to cause the beam to be deflected into a scanning beam which is directed exteriorly of the reader towards a target plane. The beam is focused by the optical lens 302 to form a spot on the target plane which moves along the scanning path across the bars of the bar code symbol as the mirror is moved. The mirror 405 is caused to oscillate when alternating current is introduced in the coil 304. The light reflected from the symbol is received by the detector 118.

All electronics and optics in this scanner are mounted on the circuit board 101 that extends into the handle of the gun shaped housing. There is no additional circuit board. The board is oriented such that it lies in a plane extending from the left side to the right side of the handle, as opposed to in a plane extending from the front to the back of the handle, as has always been done with handle boards in all other gun shaped scanners. This circuit board will have less area for components than the usual orientation because it spans the narrower left-to-right dimension of the handle instead of the larger front-to-back dimension, but this orientation has several advantages that make it worth the extra design effort needed to fit everything on a relatively small circuit board. These advantages will become apparent below.

Several parts of a hand-held scanner need to be in particular parts of the housing for them to best perform their function. For example, there needs to be a connector mounted at the bottom of the handle into which a cable can be plugged. There also needs to be indicator LEDs located at the top rear part of the housing so they can be visible to the operator when the scanner is held in its normal position. A trigger switch needs to be mounted inside the scanner in a place where it can be pushed by the trigger 106 without the need for complex linkages, and preferably without the need to run wires or a flex circuit to the switch. The circuit board positioned as described above allows the LEDs, trigger switch and cable connector to all be installed on the single circuit board, in their proper places in the housing without the need for any flex circuits etc.

This circuit board orientation also allows the optical components to be mounted on the board and for them to be positioned for optimum scanning performance and minimum assembly labor. For example, the scan motor should be positioned near the back of the housing so the laser can achieve a useable scan line length by the time the beam reaches the housing nose. The farther back the scan motor is, the less scan angle is needed to fill the nose, and the less rapid the increase of scan line length as it projects into space in front of the housing. This results in a scan line that remains brighter at an increased distance from the scanner, and also results in lower signal frequencies when scanning a symbol positioned far away from the housing. This, in turn, results in longer working range.

Many users prefer to use a bar code scanner by positioning the nose of the scanner very close to the bar code. It therefore becomes important to have a scan line that is wide enough at the nose of the scanner to cover the full width of commonly scanned bar codes, such as UPC. Most UPC symbols can be decoded by a scan line that is around 1.75 inches wide, so it is a good idea to design a scanner with a window at the nose that is at least this wide, and to drive the scan motor at a scan angle that completely fills the windows. In fact, it is best to drive the scan motor hard enough to provide a scan angle that is more than wide enough to fill the window. Because this results in maintaining a spot speed sufficient to decode right to the end of the part of the scan line that escapes through the window. At the ends of the scan line the laser spot is slowing down and reversing direction, so there is always a little bit of line length at the ends of the scan line that cannot decode a symbol. If these slow ends of the scan line are clipped off by scanning a wider scan angle than the window allows, the entire length of the scan line that is visible to the user is functional, making it more intuitive to use.

It is also important to read long symbols positioned at a distance from the nose of the scanner. It is intuitive for a user to position a scanner far enough from a bar code for the scan line to be long enough to completely cover the bar code. It is not intuitive, however, for a user to position the scanner far enough away to have the scan line be much longer than necessary to cover the bar code. Inexperienced users expect the scanner to read even if the ends of the scan line just touch the first and last bars in the symbol. Designing the scanner to over-scan the window as described above can enable the scanner to work when used this way, but only if the collection system can see all the way to the ends of the scan line. If two collection systems were positioned side by side, as in conventional designs, each collection system could only see one end of the scan line because the housing would obscure the other end of the scan line. Placing two collection systems on the center line of the scanner, one above the other allows each system to see all the way out to both ends of the scan line at any distance from the scanner. This results in a signal amplitude that is as flat as possible across the entire length of the scan line, enabling good performance, even on very long symbols that use the entire length of the scan line. It is particularly important to have a flat signal across the entire length of the scan line if very long low contrast symbols are being scanned.

Another advantage of placing two collection systems on the center line is that it becomes possible to depopulate one collection system to create a lower performance, and less expensive version of the scanner. For example, a low performance scanner can be built by not installing the lower of the two collection lenses, along with the optical filter and photodiode that would be normally installed behind that lens. In some designs, two amplifiers will be used, one for each photodiode. One of these amplifiers can also be eliminated when building the lower performance/less expensive version with a single collection system. With the collection systems located one above the other, the remaining system sees the entire length of the scan line symmetrically, resulting in an even signal level across the length of the scan line. If the two collection systems were side by side, removing one of them would not be possible because this would result in a very lopsided signal and unacceptable performance.

In the preferred embodiment, the housing will consist of one plastic part that constitutes the handle and the bottom half of the head of the gun. A second plastic part will form a canopy, or a top cover for the housing and can be molded out of clear plastic. It may be an opaque overmold of rubber-like material. There will be an opening in the overmold to allow the indicator LEDs located near the top edge of the circuit board to be visible through the clear canopy material. This eliminates the need to tool and fasten an additional light pipe component for the LEDs to the canopy, as is done on prior art scanner housings. The trigger will be a third plastic component. It will have an integrally molded spring that will urge the trigger forward when it is not pressed, to keep the trigger from rattling and having a loose, low quality feel. The exit window will be either die cut or laser cut from a flat sheet of plastic.

The circuit board orientation enables very simple final assembly of the photodetector and scanning assemblies into the housing. The trigger component will be installed into the handle first by dropping it in so that its two pivots engage nests in the housing above, and on either side of the handle. The circuit board carrying the assemblies is then lowered into the handle, sliding it into track features that are molded into the inside of the handle. The exit window is lowered into slots that are molded into the nose of the housing and than the canopy is lowered onto the handle component, and is fastened in place. The canopy can be retained with two screws and/or with snaps. There will be features on the bottom of the canopy that reach down to the trigger pivots, retaining the trigger in place.

The top edge of the circuit board can touch the inside of the canopy, which will hold the circuit board in place after the canopy has been installed. If desired, a bumper of the same material as the rubber canopy overmold can be molded onto the bottom of the canopy where the top edge of the circuit board touches the canopy. This soft material will compress when pushed against the top edge of the board so it can take up any free space due to dimensional tolerance variations and prevent the board from moving around or rattling in the handle. This rubber bumper will also let the circuit board move a little if the scanner is dropped, helping absorb shock to reduce the chance of damage. After the shock event, the rubber will push the board back to its proper position. The rubber material can also contact the top edge of the window. This will allow the canopy to deflect a little if the scanner is dropped head down on a hard surface, without damaging the window. Since there is no circuit board in the scanner's head it is possible to locate the exit window so that is deeply recessed back from the nose of the housing, reducing the likelihood that it might become scratched which would reduce the scanner's performance.

It may be necessary to position ribs on the inside surface of the canopy of the hand-held scanner to intercept laser light reflected off the exit window to keep the light from traveling back to the collection optics. These ribs must be opaque to properly perform this function. If the canopy is molded out of transparent material, as mentioned above, the ribs can be made to be opaque by covering at least one side of the ribs with the rubber-like overmolded material.

Laser scanners require that the motor scan angle and laser power be adjusted during the manufacturing process. In this case, trimpots can be located at the top edge of the circuit board where they are accessible for adjustment even after the circuit board carrying the assemblies has been lowered into the housing handle. The adjustments can then be made and the scanner tested, with the exit window in place before the canopy is installed. The canopy will only be installed after the scanner has passed its test. This is not possible with most other scanner designs because the trimpots are not accessible with the electro-optical assemblies installed in the housing. Even when the trimpots are accessible, it is usually desired to test the scan assembly and the decode board separately before joining them together in the housing, to avoid needing to disassemble the scanner if one of those assemblies is defective. With the single board scanner this is not necessary.

Other scanners are built on an assembly line that has one station where the scan assembly (unhoused) is placed on a fixture and the motor scan angle and laser power are adjusted. The unhoused scanner is often tested at this station to make sure it is working properly. It is then passed to another station where it is joined to a decoder board and installed in the housing. The decode board has already been tested at yet another station. The scanner is then passed to a third station where it is tested to make sure it was not damaged when being installed in the housing, to make sure the interconnection between the decoder and scan assembly is not defective and to make sure that the exit window in the housing is not defective which could cause poor performance. The single board design allows the operations that would normally be done at three assembly stations to be done at a single station. Redundant testing of the scanner, before and after it is installed in the housing, is also eliminated.

As one can see in FIG. 1 of the drawing, the optical assembly is mounted at an angle at the top of the circuit board, such that the scanning beam projects in a plane that is not perpendicular to the plane of the board. This allows the board to be slanted back at the bottom to accommodate the natural slope of the handle, while still allowing the laser beam to project out the exit window in the expected direction. This is a unique feature of this scanner design of the present invention. It allows the guide rails into which the circuit board slides in the inside of the housing to be made with a simple mold that can be withdrawn from the molded part without expensive cams or slides. If the circuit board were vertical, instead of slanted back at the bottom as shown, the guide rails could not be molded unless the handle was nearly perpendicular to the scan head, which is less comfortable to hold and use and which doesn't look as good.

Other scanners have been built with single circuit boards, but they are different from this design in various ways. For example, the Symbol LS1800 LaserTouch™ has all of its electronics on a single circuit board, but the laser is projected parallel to the plane of the board and is deflected out the housing nose by a fold mirror in the scanned laser path. The addition of a fold mirror adds material cost, and also requires an adjustment of the mirror angle to be made. This new design avoids the need for the fold mirror and its associated adjustment. It also differs from the LS1800 LaserTouch™ in that the orientation of the circuit board is such that it spans the narrow dimension of the housing handle, whereas the board in the LS1800 LaserTouch™ spanned the broader dimension of the housing handle, allowing the use of a much larger circuit board. The LS1800 LaserTouch™ was built as a touch scanner, like many CCD scanners, which is ergonomically different from a gun scanner. A gun-shaped scanner is better when used to scan symbols located at a distance from the housing. The ergonomics of a gun shape positions the hand differently on the handle of the scanner, as compared to touch scanners, but this requires that the handle be narrow enough to be gripped by the hand. Touch scanners have broad handles made to be picked up with the fingertips, without wrapping them around the handle. The gun ergonomics allow a circuit board to have more surface area if the board is oriented front to back, as opposed to the present invention which has the board oriented left to right. The left to right orientation is justified, however, despite the reduced circuit board area due to the advantages described above.

The Symbol CS-2000 and CS-1504 scanners have a single circuit board. These scanners, however, also project the scanned laser beam in a plane that is parallel to the circuit board. They are not gun-shaped scanners, so they are not as well optimized for use in environments where very frequent scanning or scanning from a distance is required. In addition, the circuit board orientation in these scanners has the boards spanning the wide dimension of the housing, not the narrow dimension.

The Welch Allyn IT3800 single board CCD scanner has a gun shape. It has all electronics and optics mounted on a circuit board in the head of the scanner housing, not in the handle. The scan plane is parallel to the plane of this circuit board. With the circuit board in the head of the gun-shaped housing, the scanner needs to run a flex circuit down the handle to connect to a connector mounted at the bottom of the handle, into which the cable is plugged. This connector needs to be captured by an additional plastic component, which is retained by a screw in the bottom of the handle. The flex circuit needed to plug into another connector mounted on the bottom of the circuit board. These additional parts (the flex circuit, the connector for the flex on the bottom of the circuit board, the connector retainer and the screw) along with the labor to install them are all eliminated by our new design.

Figure 5:
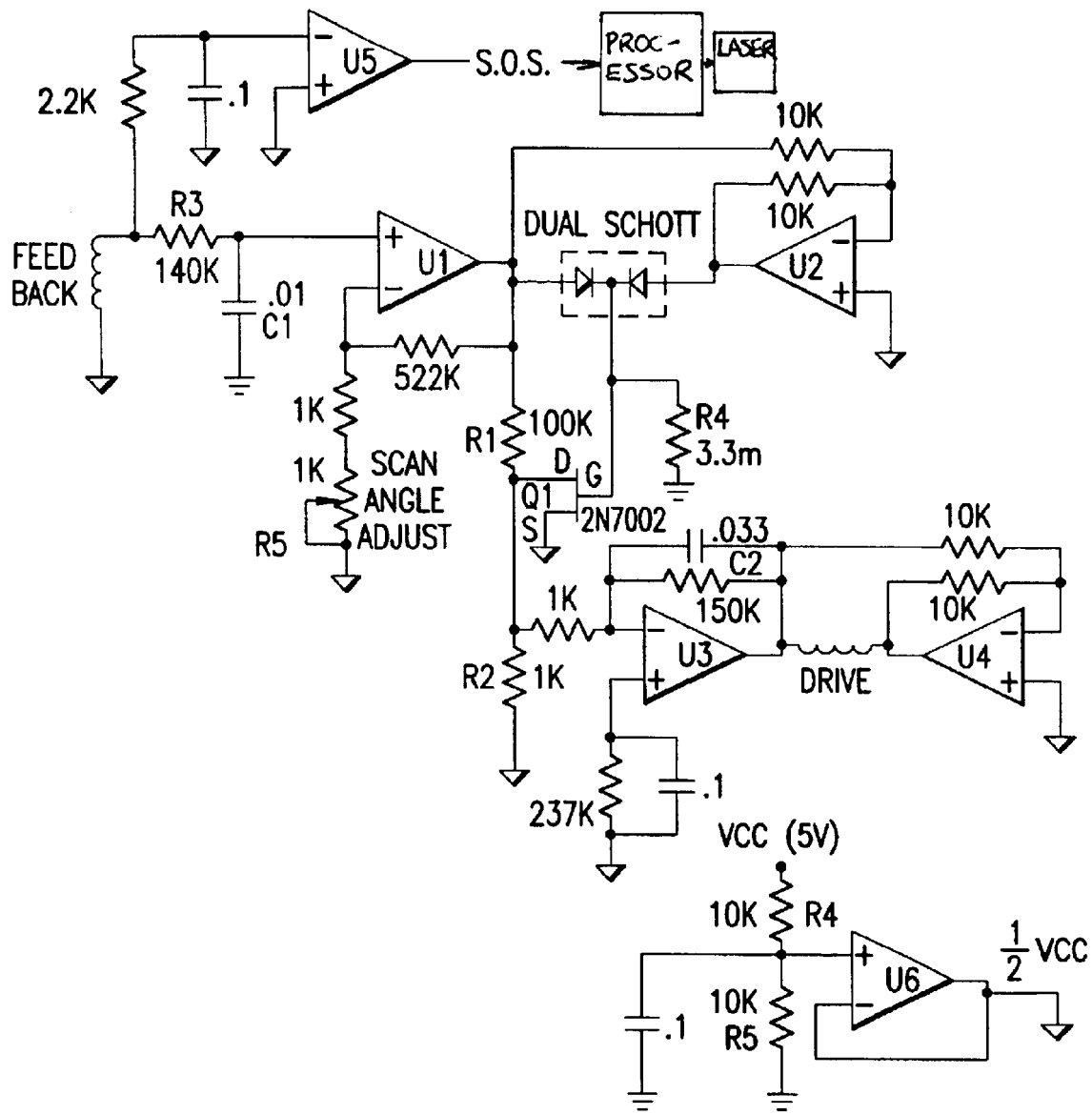
FIG. 5 is an electrical schematic of a bi-directional motor drive circuit in accordance with this invention for use in the reader of FIG. 1.

FIG. 5 is an electrical schematic diagram of a motor drive circuit for a scan motor that runs at its own natural frequency. The motor itself determines the frequency at which it is driven, so that the circuit always drives the motor at its own natural frequency, which is the most power efficient way to operate the motor. It is known to provide motor drives, e.g., for Mylar™ motors, that also drive a motor at its own natural frequency. Unlike the drives known in the past, however, this circuit drives the motor in both directions. Prior art motor drives drove the motor in only one direction and let the motor coast back in the other direction.

A bi-directional drive like this has the advantage that it can accelerate the motor up to the required scan angle faster than a single directional drive because it can push on the motor all the time, as opposed to only half the time for a uni-directional drive circuit. Alternatively, a motor can be accelerated at the same rate as a uni-directional drive without the surge currents being as large because it can use twice as many current surges (half in each direction) each of which each half as large as would be required by a unidirectional drive. Another advantage of this kind of drive is that it can be used on resonant motors that are more highly damped than the typical Mylar motor. This makes it a good choice for driving a motor that uses a silicone rubber flexure, such as provided in the embodiment of FIGS. 1 through 4C.

The silicone rubber material damps the motion more than a plastic or metal flexure would. This means that the motor will coast to a stop faster once the drive is removed. If the motor was driven in only a single direction and allowed to coast in the other direction, as is known with the plastic Mylar motors, the scan angle would decrease significantly in the undriven direction, as compared to the driven direction. Measurements on prototype motors using rubber flexures such as shown in FIGS. 1–4C show that the motor amplitude will reduce by about 20% after a half cycle of coasting. In other words, the scan angle on one side of center would be 20% less than on the other side of center if a uni-directional drive was used to drive a motor with a silicone rubber flexure. Driving the motor equally in both directions avoids this problem.

The motor is driven by a coil wound on a bobbin that is located physically close to a magnet that is mounted on the moving part of the motor. A secondary winding is also wound in the same bobbin. When the motor is moving, the movement of the magnet generates an A.C. voltage in this secondary winding. The frequency of this generated A.C. voltage is the same as the movement of the motor, with one cycle of the A.C. corresponding to one cycle of motor motion. The amplitude of the A.C. voltage is proportional to the velocity of the motor's motion. This velocity changes when either the scan angle or the resonant frequency of the motor changes, so if the resonant frequency is stable the only thing that will cause the amplitude of this A.C. signal to change is the scan angle. The silicone rubber material changes its stiffness very little over the temperature range over which this scanner must operate, so changes in resonant frequency are small. Amplitude of the A.C. signal is therefore a good indication of scan angle, making it useable as a feedback signal that can be used to regulate the scan angle at which the motor operates.

The polarity of the A.C. signal is dependent on the direction of the motion of the motor, so there is a positive half cycle of the A.C. signal when the motor is moving in one direction, and a negative half cycle when the motor moves in the other direction. Zero crossings occur when the motor reaches its maximum travel at each end of the scan line. At this instant the motor stops, just before reversing, and the voltage drops momentarily to zero before increasing again with the opposite polarity.

The circuit operates as follows:

The A.C. feedback signal is filtered by R3 and C1. It is amplified by op-amp U1. The output of U1 is connected to the inverting input of U2, which has a gain of 1, so the output of U2 is an inverted copy of the output of U1. The outputs of U1 and U2 are connected to two diodes which, along with resistor R4, form a full wave rectified version of the amplified feedback signal which is applied to the gate of FET Q1.

The output of U1 is also connected to R1, which forms a voltage divider with R2. The input resistor of U3 is connected to the junction of R1 and R2, so U3 amplifies the voltage from the output of U1 that has been divided down by the voltage divider. U3 amplifies this divided-down voltage up to a level sufficient to drive the motor and applies it to one end of the motor drive winding. The other end of the drive winding is connected to the output of U4 which applies an inverted version of the output of U3. The voltage applied to the drive winding is of the same frequency as the A.C. signal generated in the feedback winding because it is actually the same signal after it has been amplified. This signal is the same frequency as the motor's natural frequency because it is actually generated by the motor itself as it moves at its natural frequency. The motor is therefore driven at its own natural frequency, where it is most efficient, requiring a minimum amount of drive current to maintain its motion.

The amplitude, or scan angle of the motor is regulated at a pre-determined magnitude by FET Q1. The gate of this FET is connected to the full wave rectified version of the feedback signal, as described above. This full wave rectified voltage achieves maximum amplitude when the motor is moving through the center of its scan angle, in either scan direction, when the motor velocity is highest. This voltage, which is proportional to motor velocity, is applied to the gate of the FET. If the velocity increases, this voltage also increases turning the FET partially on. The higher the feedback signal goes, the more completely the FET turns on, and the longer the duration for which it is turned on becomes. When the FET turns either partially or fully on, it attenuates the signal at the junction of R1 and R2 because it acts like a variable resistor in parallel with R2. This signal is amplified and applied to the drive winding of the motor, so when it is attenuated by the FET, the voltage applied to the drive winding is also attenuated, reducing the scan angle until the velocity signal decreases enough to turn the FET on for a shorter duration, or to keep it from turning on as completely. The scan angle will settle at an amplitude that is just enough to turn the FET on a little each half cycle, providing just enough drive to maintain a constant scan angle.

The voltage divider formed by R1 and R2 reduces the voltage across the FET drain and source terminals. This is necessary because the FET will only act like a resistor when the voltage across it is small. At higher voltages, the FETs apparent resistance changes with voltage magnitude and polarity, which would distort the drive waveform, tending to make it asymmetrical, which would cause an offset in the motor's scan angle.

The op-amp U3 has capacitor C2 in its feedback loop. This causes U3 to act as a low pass filter, as well as an amplifier, applying a filtered waveform to the drive winding. This is necessary to prevent abrupt changes in the drive, that occur when the FET turns on, from coupling from the drive winding to the secondary winding which would distort the feedback signal. This can happen because both windings are wound on a single bobbin and can act like a transformer. U4 does not need a feedback capacitor because it replicates an inverted version of the filtered waveform at the output of U3.

Op-amp U6 buffers a voltage formed by divider R4 and R5. These resistors are shown as having equal values, so this buffered voltage will be half of the power supply voltage. The circuit can also function with voltages other than half of the power supply voltage formed by the voltage divider. The choice will depend on the power supply voltage, the op-amps used, etc. The output of U6 forms an analog ground, indicated by the triangle symbol. Notice that one end of the secondary winding is connected to this analog ground, so the generated voltage is an A.C. voltage that is centered at this voltage. All the other op-amps in the circuit are also referenced to analog ground, so all of the various waveforms are also centered around analog ground.

This kind of motor drive is not inherently self-starting because it depends on driving the motor with an amplified version of the voltage that is generated when the motor is moving. If the motor is not moving, there is no generated voltage to amplify and drive the motor with, so the motor will not run. If anything causes the motor to move, however, a signal will be generated in the secondary winding which will be amplified and used to drive the motor, so the circuit is self-sustaining after it has been initially started. It is therefore necessary to provide a means of starting the motor when power is applied to the drive circuit. Capacitor C1 serves this purpose, along with its function of filtering the feedback signal, as mentioned above.

One end of capacitor C1 is connected to circuit ground, not to analog ground. If the circuit is powered by a 5 volt power source, and if analog ground is half of the power supply voltage, as shown, circuit ground will be at 0 volts and analog ground will be at 2.5 volts. This means that when power is initially applied to the circuit, C1 will charge up to the voltage of analog ground (2.5 volts) through R3 and the secondary coil winding. Initially C1 will be discharged, so it will hold the input of U1 near circuit ground, causing its output to swing down to circuit ground. After C1 charges up, the output of U1 becomes an amplified reproduction of the A.C. voltage generated by the moving magnet. This negative-going pulse on the output of U1, that occurs at power-up, is amplified by U3 and reproduced in inverted form by U4. These two amplifiers apply the pulse, with opposite polarities to the motor's drive winding, causing it to start moving. The pulse ends when C1 has become fully charged, and the motor continues running, driven by the amplified A.C. feedback signal that is now available.

Voltage comparator U5 creates a start-of-scan (SOS) signal by sensing when the A.C. feedback signal crosses through zero (analog ground). As mentioned above, the feedback drops to zero when the motor briefly stops at the end of a scan, before resuming motion in the opposite direction. The output of U5 goes low when the motor is moving in one direction, and high when the motor moves in the other direction. The resistor and capacitor on the input of U5 filter out noise in the feedback signal that might create undesired output transitions of U5.

The aforementioned rotor, magnet and scanning element are jointly oscillated by the drive via the drive winding at the resonant frequency of the resonant motor. The feedback signal has a feedback frequency which corresponds to the resonant frequency. The comparator U5 acts as a zero crossing detector to generate the SOS signal having an SOS frequency which also corresponds to the resonant frequency. The SOS signal is used to detect all possible ways that the drive might fail. The possible reasons for drive failure include:

1. Foreign matter may partially block the motion of the motor, allowing it to move, but at a reduced amplitude. This will cause a change in the frequency of the SOS signal.

2. The drive winding may become open or disconnected. This will cause the motor to stop; there will be no feedback signal; and transitions of the SOS signal will stop.

3. The feedback winding may become open or disconnected. The SOS transitions will stop.

4. The magnet attached to the scan element may become disconnected from the motor due to faulty glueing. In this case, the SOS transitions will stop.

5. One or both flexures may fail. This will cause either a reduction of the frequency of the SOS signal, because the resonant frequency of the system is dependent on the flexures, or the motor may stop altogether if both flexures fail, causing SOS transitions to stop.

All these failure reasons can be detected by monitoring the frequency of the SOS signal. The decoder installed on the circuit board with the scanner assembly already monitors the SOS signal to tell the decoder when a new scan is beginning. The microprocessor used for decoding can also be used to monitor the SOS frequency. If the SOS frequency goes out of the normal operating range, the microprocessor, which is normally in charge of turning the laser on and off, will not turn the laser on, even if the trigger is pulled, or will turn the laser off if it was already on when the motor failed. This eliminates the need to add any circuitry hardware to achieve the drive failure detection function, thereby reducing the cost of the scanner.

In the actual implementation according to the present invention, the software-based failure sensor must not falsely detect a failure due to normal variations in the drive, either from temperature changes, or from unit to unit variations. Therefore, a tolerance analysis determined that all normal variations, due to temperature extremes, manufacturing tolerances, etc., would not result in SOS frequency variations larger than ±20% from the nominal 50 Hz operating resonant frequency. The software in the decoder therefore is designed to continuously monitor the time between SOS transitions. If this time ever exceeds, or is less than the nominal value (10 ms)±25%, then the processor will immediately turn off the laser, and prevent the laser from turning on again unless the SOS frequency returns to within the acceptable range.

The largest source of noise is coupling from the drive winding to the secondary feedback winding. This coupling can be reduced by minimizing the high frequency content of the drive waveform. This is why drive amplifier U3 has a large feedback capacitor, as mentioned above. Filtering the drive waveform this way minimizes how much filtering must be done on the input of the start-of-scan comparator. It is important to minimize the input filter because the filter causes a delay that makes the timing of the start-of-scan signal inaccurate.

The values shown on FIG. 5 were tested on a silicone flexure motor that has a resonant frequency of around 40 Hz.

There are several points to note concerning this drive circuit:

First, this circuit provides a bi-directional drive for a resonant motor that uses an FET as a variable resistor to control the magnitude of the drive signal. Other bi-directional drives vary the drive with a multiplying circuit.

Second, the use of a FET as a variable resistor requires that the signal that is attenuated by the FET be very small. That is why the signal applied to the drive amplifier (U3) input is divided down by R1 and R2, and than amplified back up by U3. Another way to use a FET would be to connect the input of U3 directly to the feedback (secondary) winding through a divider, and let the FET attenuate the input of U3 in a similar way. A key aspect of the present invention is the step of first dividing the signal down before applying it to a FET for variable attenuation, and then amplifying it up again before applying it to the motor drive winding.

Third, other drive circuits use a peak detector with a long time constant to create an essentially D.C. voltage that is proportional to the motor velocity. This D.C. voltage is used as the feedback signal. The problem with this is that the long time constant of this peak detector can make the control loop slow to react to changes in the motor's behavior, making the loop unstable. This can be observed as rapid fluctuations of the scan angle as the loop constantly tries to bring the scan angle to the desired angle, but continuously overshoots the proper adjustment. It overshoots because the slow response of the peak detector keeps the loop from immediately detecting when the proper amplitude has been achieved, so the loop continues trying to change the drive for a short time after proper amplitude occurs. As a result, the loop doesn't realize that the motor has achieved proper amplitude until after it has overshot the desired level, at which time the loop will start adjusting again, but in the other direction. This is a common problem in circuits that are used to regulate motor speed. It is normally fixed by using a network that has a time response opposite to the various delays in the circuit, to cancel them out. This adds complexity.

The present invention has no such peak detector, but instead uses the rectified A.C. voltage, that was generated in the secondary winding, as the feedback signal. This signal responds immediately to changes in the motor scan angle, so the loop can instantly correct them. The loop is stable because it instantly adjusts the drive to the level needed to sustain a constant scan angle as soon as the proper scan angle is achieved, avoiding any overshoot.

Fourth, a critical part of the design of the present invention is the feedback capacitor on U3 which reduces the amplifier's ability to apply high frequencies to the drive winding. This, in turn, minimizes the coupling between the drive winding and the feedback winding that would otherwise distort the feedback signal. Some additional filtering is still necessary, which is why there is a series resistor and a capacitor to ground on the input to U1. There is a similar filter on the input of U5, but notice that this filter is of a much shorter time constant. This assures that the start-of-scan signal is not delayed any more than necessary. The present invention provides a bi-directional drive with two separate low pass filters, one of which filters the feedback signal that is used to regulate the motor scan angle, and the other of which filters the signal used to detect the start-of-scan would be useful to prevent others from using a similar circuit.

Fifth, this circuit uses capacitor C1 to perform the dual functions of filtering the feedback signal and also creating the drive pulse that causes the motor to start moving when power is initially applied to the circuit.

Sixth, the drive malfunction detection is achieved without resorting to the use of any new hardware.

Although the invention has been discussed with reference to certain scanner housings, injection molded motor hinges, triggering mechanisms and other features of the disclosed embodiment, it will be understood that a variety of housing styles and shapes, motor hinges, and triggering mechanisms could be used. Other conventional features of bar code reading systems can also be included if so desired. The invention is preferably implemented using miniaturized components such as those described herein or in the materials referenced herein, or otherwise known in the art. However, the scanner of the present invention is not limited to use in portable devices and can also be easily adapted for use in a wearable unit, or a stationary housing either of the "table top" or "projection" variety, or so-called conveyer belt or tunnel scanning systems, wherein the item on which the symbol resides is moved across the scanner head.

Additionally, even though the present invention has been described with respect to reading one-dimensional bar codes, it is not limited to such embodiments, but may also be applicable to more complex indicia scanning or data acquisition applications such as two-dimensional bar codes and matrix array symbols comprised of geometric shapes. It is conceivable that the present invention may also find application for use with various machine vision or optical character recognition applications in which information is derived from indicia such as printed characters or symbols, or from the surface or configurational characteristics of the article being scanned.

In addition to being packaged in specific housings, the elements of the reader may be implemented in a very compact assembly or OEM subassembly such as a single integral module or "scan engine". Such a module can interchangeably be used as the dedicated scanning element for a variety of different operating modalities and types of data acquisition systems. For example, the module may be alternatively used in a hand-held manner, in a table top gooseneck scanner attached to a flexible arm or mounting extending over the surface of the table or attached to the underside of the table top, or as a subcomponent or subassembly of a more sophisticated data acquisition system such as a tunnel scanner system.

Each of these different implementations is associated with a different modality of reading bar code or other symbols. Thus, for example, the hand-held scanner is typically operated by the user aiming the scanner at the target; and the table top scanner operated while the target is moved rapidly through the scan field, or presented to a scan pattern which is imaged on a background surface. Still other modalities within the scope of the present invention envision the articles being moved past a plurality of scan modules oriented in different directions so that the field of view allows at least one scan of a symbol which may be arbitrarily positioned on the article.

The module could advantageously comprise various optical subassemblies mounted on a support, and photodetection components, such as a photodiode, charge coupled or solid state imaging device. Control or data lines associated with such components may be connected to an electrical connector mounted to enable the module to be electrically connected to a mating connector associated with other elements of the data acquisition system.

An individual module may have specific scanning or decoding characteristics associated with it, e.g., operability at a certain working distance, or operability with one or more specific symbologies or printing densities. The characteristics may also be defined through the manual setting of control switches associated with the module. The user may also adapt the data acquisition system to scan different types of articles or the system may be adapted for different applications by interchanging modules in the data acquisition system through the use of a simple electrical connector.

The scanning module described above may also be implemented within a self-contained data acquisition unit including one or more such components as a keyboard, display, printer, data storage, application software, and databases.

Such a unit may also include a communications interface to permit the data acquisition unit to communicate with a host computer, or other components of a data processing system, or with remote computers through a local or wide area network or with the telephone exchange network, either through a modem or an ISDN, XDSL, or cable interface, or by low power radio broadcast from a portable terminal to a stationary or mobile receiver and thereafter to other system components.

It will be understood that each of the features described above, or two or more together, may find a useful application in other types of scanners and readers differing from the types described above.

While the invention has been illustrated and described as embodied in monitoring bi-directional motor drive failure in an electro-optical reader, it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic or specific aspects of this invention and, therefore, such adaptations should and are intended to be comprehended within the meaning and range of equivalents of the following claims.

What is claimed as new and desired to be protected by Letters Patent is set forth in the appended claims.

I claim:

1. An arrangement for detecting a malfunction of a bi-directional motor drive in a reader for electro-optically reading indicia, the arrangement comprising:

a) a resonant motor having a rotor oscillatable about an axis;

b) a permanent magnet jointly oscillatable with the rotor;

c) a scanning element jointly oscillatable with the rotor, and operative for directing a light beam at the indicia to be electro-optically read;

d) a drive coil in operational proximity with the magnet, and operative for generating a drive signal to drive the rotor, the magnet and the scanning element in opposite directions about the axis over the indicia at a resonant frequency;

e) a feedback winding in operational proximity with the magnet, and operative for generating a feedback signal having a feedback frequency corresponding to the resonant frequency during oscillation of the magnet;

f) a zero crossing detector for detecting zero crossings of the feedback signal to generate a start of scan (SOS) signal having an SOS frequency; and g) a control processor for monitoring the SOS frequency, and for sensing the malfunction when the SOS frequency is outside a predetermined range of SOS frequencies.

2. The arrangement of claim 1, wherein the scanning element is a light reflector.

3. The arrangement of claim 1, wherein the zero crossing detector is a comparator having one input connected to a reference voltage, another input to which the feedback signal is conveyed, and an output from which the SOS signal is conveyed to the processor.

4. The arrangement of claim 1, wherein the processor generates a laser shut-off signal when the malfunction is sensed.

5. The arrangement of claim 1, wherein the predetermined range of SOS frequencies is ±20% of the resonant frequency.

6. A method of detecting a malfunction of a bi-directional motor drive in a reader for electro-optically reading indicia, the method comprising the steps of:
   a) mounting a rotor of a resonant motor for oscillation about an axis;
   b) mounting a permanent magnet for joint oscillation with the rotor;
   c) mounting a scanning element for joint oscillation with the rotor;
   d) directing a light beam at the indicia to be electro-optically read;
   e) generating a drive signal to drive the rotor, the magnet and the scanning element in opposite directions about the axis over the indicia at a resonant frequency;
   f) generating a feedback signal having a feedback frequency corresponding to the resonant frequency during oscillation of the magnet;
   g) detecting zero crossings of the feedback signal to generate a start of scan (SOS) signal having an SOS frequency; and
   h) monitoring the SOS frequency, and sensing the malfunction when the SOS frequency is outside a predetermined range of SOS frequencies.

7. The method of claim 6, wherein the scanning element is a light reflector.

8. The method of claim 6, wherein the zero crossing detecting is performed by a comparator.

9. The method of claim 6, and the step of generating a laser shut-off signal when the malfunction is sensed.

10. The method of claim 6, wherein the predetermined range of SOS frequencies is ±20% of the resonant frequency.

* * * * *